(12) United States Patent
Ridge et al.

(10) Patent No.: US 11,468,505 B1
(45) Date of Patent: Oct. 11, 2022

(54) COMPUTER-BASED SYSTEMS FOR CALCULATING RISK OF ASSET TRANSFERS

(71) Applicant: Wells Fargo Bank, N.A., San Francisco, CA (US)

(72) Inventors: Teresa Ridge, Alamo, CA (US); Timothy Feifs, Greensboro, NC (US); Dustin Scott Mountcastle, Charlotte, NC (US); Magdalena J. Vega, Aurora, CO (US); David G. Coffaro, Fullerton, CA (US); Leonard Mauney, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 296 days.

(21) Appl. No.: 16/006,004

(22) Filed: Jun. 12, 2018

(51) Int. Cl.
*G06Q 40/02* (2012.01)
*G06Q 10/06* (2012.01)

(52) U.S. Cl.
CPC ......... *G06Q 40/02* (2013.01); *G06Q 10/0635* (2013.01); *G06Q 10/06316* (2013.01)

(58) Field of Classification Search
None
See application file for complete search history.

(56) References Cited

U.S. PATENT DOCUMENTS

| | | | |
|---|---|---|---|
| 6,941,376 B2 | 9/2005 | Mitchell et al. | |
| 7,630,986 B1 | 12/2009 | Herz et al. | |
| 7,853,469 B2 | 12/2010 | Maitland et al. | |
| 8,386,481 B1 | 2/2013 | Croner | |
| 8,533,092 B1 | 9/2013 | Burrow et al. | |
| 8,731,992 B1 | 5/2014 | Anthony et al. | |
| 8,892,409 B2 | 11/2014 | Mun | |
| 10,096,068 B1 | 10/2018 | Ross et al. | |
| 2004/0122756 A1* | 6/2004 | Creeden | G06Q 40/00 705/35 |
| 2005/0144108 A1 | 6/2005 | Loeper | |
| 2007/0156673 A1* | 7/2007 | Maga | G06Q 30/02 |

(Continued)

FOREIGN PATENT DOCUMENTS

WO 2001043037 A1 6/2001

OTHER PUBLICATIONS

Office Action from U.S. Appl. No. 15/091,961, dated Jun. 14, 2019, 16 pp.

(Continued)

*Primary Examiner* — William J Jacob
(74) *Attorney, Agent, or Firm* — Shumaker & Sieffert, P.A.

(57) ABSTRACT

A computer system is described that is configured to calculate probable risks of assets being transferred away from an institution that is currently holding the assets. In order to reduce transfers of assets from an institution, the computer system is configured to predict a likelihood of transfer of the asset from the institution based on the client data. The computer system is configured to predict a risk of transfer of the asset that takes into account the value of the asset. For example, particular higher value assets may be more valuable to the financial institution than other assets given a comparable likelihood of transfer. The computer system is further configured to propose and/or prioritize actions, such as potential advising opportunities, to minimize the risk of transfer of the asset from the financial institution.

17 Claims, 6 Drawing Sheets

(56) References Cited

U.S. PATENT DOCUMENTS

| | | | |
|---|---|---|---|
| 2007/0168302 A1* | 7/2007 | Giovinazzo | G06Q 40/06 705/36 R |
| 2007/0185867 A1* | 8/2007 | Maga | G06F 16/24 |
| 2008/0086741 A1 | 4/2008 | Feldman et al. | |
| 2009/0240574 A1* | 9/2009 | Carpenter | G06Q 40/06 705/36 R |
| 2009/0276289 A1 | 11/2009 | Dickinson et al. | |
| 2010/0023411 A1* | 1/2010 | Jayasuriya | G06Q 40/12 705/17 |
| 2010/0057633 A1* | 3/2010 | Zafar | G06Q 40/06 705/36 R |
| 2011/0125672 A1* | 5/2011 | Rosenthal | G06Q 40/04 705/36 R |
| 2011/0302079 A1* | 12/2011 | Neuhaus | G06Q 40/02 705/39 |
| 2012/0022917 A1* | 1/2012 | Lawton | G06Q 30/02 705/7.31 |
| 2012/0254002 A1* | 10/2012 | Kundagrami | G06Q 40/02 705/35 |
| 2014/0181194 A1* | 6/2014 | Sullivan | H04L 67/22 709/204 |
| 2014/0280065 A1 | 9/2014 | Cronin et al. | |
| 2015/0032503 A1* | 1/2015 | Chander | G06Q 30/0201 705/7.29 |
| 2015/0051957 A1* | 2/2015 | Griebeler | G06Q 10/06395 705/7.41 |
| 2015/0186817 A1 | 7/2015 | Kim et al. | |
| 2015/0269244 A1 | 9/2015 | Qamar et al. | |
| 2016/0132960 A1* | 5/2016 | Roberts | G06F 3/0481 705/27.1 |
| 2016/0189082 A1* | 6/2016 | Garrish | G06Q 30/01 705/7.39 |
| 2016/0217419 A1 | 7/2016 | Majumdar et al. | |

OTHER PUBLICATIONS

Final Office Action from U.S. Appl. No. 15/091,961, dated Oct. 31, 2018, 16 pp.
Response to Final Office Action dated Oct. 31, 2018, from U.S. Appl. No. 15/091,961, filed Jan. 31, 2019, 18 pp.
Advisory Action from U.S. Appl. No. 15/091,961, dated Feb. 8, 2019, 3 pp.
Response to Advisory Action dated Feb. 8, 2019, from U.S. Appl. No. 15/091,961, filed Feb. 28, 2019, 8 pp.
Prosecution History from U.S. Appl. No. 15/091,861, dated Mar. 27, 2018 through Aug. 22, 2018, 33 pp.
Office Action from U.S. Appl. No. 17/027,171, dated Apr. 5, 2022, 17 pp.
Response to Office Action dated Apr. 5, 2022 from U.S. Appl. No. 17/027,171, filed Aug. 5, 2022, 15 pp.

* cited by examiner

COMPUTER-BASED SYSTEMS FOR CALCULATING RISK OF ASSET TRANSFERS

TECHNICAL FIELD

The invention relates to computer-based systems configured to calculate probable risk of future events based on currently available data.

BACKGROUND

Financial institutions, such as commercial and investment banks, manage financial assets for clients. Financial assets may be managed through bank accounts, brokerage accounts, and other accounts that are managed by the financial institution. Due to various events affecting a client, the client may transfer a financial asset from the financial institution, such as to another financial institution. As an example, an asset owned by a client and managed by a financial institution may change ownership from the client to one or more beneficiaries of the client. This transfer of the asset may occur voluntarily, such as through gifting, or involuntarily, such as through probate. Once the asset is owned by or vested in the beneficiaries, they or a third party may decide to transfer the asset from the financial institution. For example, a cash balance of a bank account managed by a financial institution may be withdrawn by a client upon retirement of the client and distributed among the beneficiaries of the client. After withdrawal, the cash balance is no longer available to the financial institution for further lending, investment, or maintenance.

SUMMARY

In general, this disclosure describes computer-based techniques for calculating probable risks of assets being transferred away from an institution that is currently holding the assets. More specifically, the computer-based techniques include predicting potential transfers of management of assets from an institution and prioritizing responses to the predicted potential transfers based on the risk to the institution of losing the particular assets. In order to reduce transfers of assets from an institution, the disclosed techniques enable a risk assessment unit running on an administrative computer to predict a likelihood of transfer of the asset from the institution based on the client data. The institution may collect client data that is predictive of transfer of ownership or change in interest of the asset to beneficiaries of the client, and subsequent transfer of management of the asset from the institution. For example, various characteristics of the client, the asset of the client, and the beneficiaries of the client may be predictive of the likelihood of transfer of the asset, such as biographical factors such as age of the client, location of beneficiaries of the client, and life events of the client. The disclosed techniques may further enable the risk assessment unit to predict a risk of transfer of the asset that takes into account the value of the asset. For example, particular higher value assets may be more valuable to the financial institution than other assets given a comparable likelihood of transfer or may be more likelihood to lead to a disrupted financial plan. By collecting and analyzing data for the client and the beneficiaries likely to benefit from the asset of the client, whether as inheritors or transferees, the techniques disclosed herein may better predict a likelihood of a potential transfer of the asset and, correspondingly, an urgency of addressing the potential transfer.

The disclosed techniques may further enable an advisory unit on the administrative computer to propose and/or prioritize actions, such as potential advising opportunities, to minimize the risk of transfer of the asset from the financial institution. For example, the advisory unit may prioritize advising opportunities of various clients, recommend particular advising opportunities to a client based on characteristics of the client, and/or predict a value of retained assets from various clients at a future date.

In this way, the techniques discussed herein may enable an institution to predict potential transfers of assets from the institution, manage advising opportunities based on those predictions, and estimate potential values of retaining those assets. For example, an advisor or other relationship manager of a client may receive information related to a potential transfer of the asset from the institution and execute an advising action, such as contacting the client to discuss updates to a financial plan, to assist the client and potentially retain the assets of the client.

In one example, this disclosure is directed to a method by one or more processors of a computing device, including receiving, for each of a plurality of clients, client data. Each of the plurality of clients owns at least one asset held by an institution. The method further includes determining, for each of the plurality of clients, a likelihood of transfer of the at least one asset from the institution based on the client data. The method further includes determining, for each of the plurality of clients, a risk of transfer of the at least one asset from the institution based on the likelihood of transfer and an asset value of the at least one asset. The method further includes prioritizing a potential advising opportunity of each of the plurality of clients based on the risk of transfer of the at least one asset from the institution.

In another example, this disclosure is directed to a computing device comprising one or more storage units and one or more processors in communication with the storage units. The one or more processors are configured to receive, for each of a plurality of clients, client data. Each of the plurality of clients owns at least one asset held by an institution. The one or more processors are further configured to determine, for each of the plurality of clients, a likelihood of transfer of the at least one asset from the institution based on the client data. The one or more processors are further configured to determine, for each of the plurality of clients, a risk of transfer of the at least one asset from the institution based on the likelihood of transfer and an asset value of the at least one asset. The one or more processors are further configured to prioritize a potential advising opportunity of each of the plurality of clients based on the risk of transfer the at least one asset from the institution.

In a further example, this disclosure is directed to a non-transitory computer-readable storage medium having stored thereon instructions that, when executed, cause one or more processors to receive, for each of a plurality of clients, client data. Each of the plurality of clients owns at least one asset held by an institution. The instructions further cause the one or more processors to determine, for each of the plurality of clients, a likelihood of transfer of the at least one asset from the institution based on the client data. The instructions further cause the one or more processors to determine, for each of the plurality of clients, a risk of transfer of the at least one asset from the institution based on the likelihood of transfer and an asset value of the at least one asset. The instruction further cause the one or more processors to prioritize a potential advising opportunity of each of the plurality of clients based on the risk of transfer the at least one asset from the institution.

The details of one or more examples of the invention are set forth in the accompanying drawings and the description below. Other features, objects, and advantages of the invention will be apparent from the description and drawings, and from the claims.

DETAILED DESCRIPTION

Figure 1:
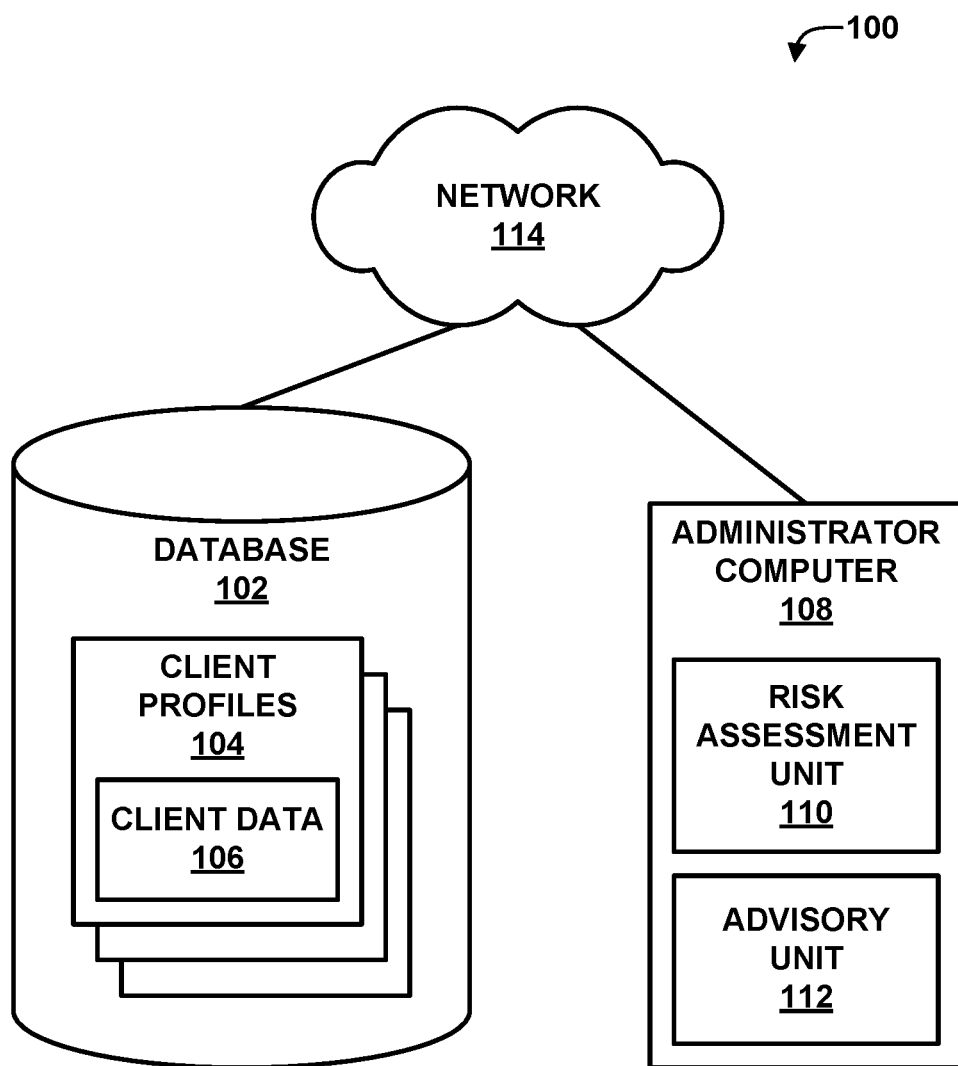
FIG. 1 is a block diagram illustrating an example system that includes an administrator computer configured to evaluate and calculate a risk of transfer of management of an asset from an institution, in accordance with the techniques of this disclosure.

FIG. 1 is a block diagram illustrating an example system 100 that includes an administrator computer 108 configured to evaluate and calculate a risk of transfer of management of an asset from an institution, in accordance with the techniques of this disclosure.

In this example, system 100 includes administrator computer 108 and database 102 in communication with each other via network 114. Database 102 may include client profiles 104 containing client data 106 for each respective client. Administrator computer 108 may include risk assessment unit 110 and advisory unit 112. Although FIG. 1 only illustrates one database 102 and one administrator computer 108, in other examples system 100 may include more than one of any of database 102 and administrator computer 108.

Network 114 may comprise a private network including, for example, a private network associated with an organization, or may comprise a public network, such as the Internet. Although illustrated in FIG. 1 as a single entity, in other examples network 114 may comprise a combination of public and/or private networks.

Database 102 may be a data structure for storing data related to the system 100 including client profiles 104. Database 102 may be stored by any suitable party and in any suitable location according to particular needs. For example, database 102 may be stored and maintained by an organization associated with system 100 or by a third-party vendor that stores and maintains data. Although illustrated as a single database 102, any suitable number of databases may be used for storing the data described according to particular needs. Although shown as being separate from administrator computer 108, in certain examples, database 102 may be stored and executed within administrator computer 108.

Client profiles 104 stored in database 102 may contain client data 106 that is associated with a particular client and includes profile information of the particular client. A client may include any customer of an institution that owns at least one asset managed by the institution. An asset may include anything of value that may be managed by the financial institution through an account held at the institution or other contractual arrangement between the client and the institution. For example, a bank client may be a business owner with a cash balance in one or more business accounts at a bank. Assets may include, but are not limited to, financial assets, such as cash or equity instruments; nonfinancial assets, such as real estate; intangible assets, such as patents; business assets, such as business accounts; personal assets, such as personal checking or savings accounts; trusts, such as charitable and real estate trusts; and the like. Assets may change form, such that retention of an asset by a financial institution may include derivatives of a particular asset for which at least a portion is continued to be managed by the institution. For example, a client may transfer a balance from a certificate of deposit account to a savings account upon expiration of the term of the certificate of deposit.

While the financial institution manages assets of the client, the client may undergo various life events that change one or more financial goals of the client. Life events may include, but are not limited to, marriage, child birth, retirement of the client, retirement of family members of the client, death of the client, death of family members of the client, and other life events. This change in financial goals may lead to a change in a form or management of one or more assets of the client, such as to beneficiaries of the client. If an advisor or other relationship manager is unaware of or unprepared to handle this change in financial goals, management of the assets of the client, whether through the client or beneficiaries of the client, may leave the financial institution. In some instances, a presence or influence of beneficiaries of the client may influence whether the assets of the client leave the institution. For example, as financial information becomes more accessible and financial literacy more common among a younger age cohort, a role of beneficiaries in influencing a direction of an asset or potential asset of the beneficiary may increase. As another example, an advisor of the beneficiaries may be unaware of an intent of the client, and may advise to transfer an asset of the beneficiary without regard for that intent.

As an example, the client may be a client near retirement age, such as between the ages of 55 and 70. A client at or near retirement may change financial goals that results in a change in the asset of the client, such as a change in ownership of the asset, change in beneficiaries of the asset, change in form of the asset, or change in management of the asset. For example, a client who is a business owner may wrap up her business by selling her business interest to another entity and may use the income from the sale to set up a retirement account for herself and a trust for her beneficiaries. The client may have used the financial institution for financial services managing the business, such that money that was managed by the institution in the form of accounts during the operation or sale of the business may be managed as a brokerage account and/or a trust after the asset change.

As another example, the client may be an end-of-life client. An end-of-life client may have planned (e.g., through contract) or unplanned (e.g., through intestacy) transfers of assets of the client to one or more beneficiaries such that, upon death of the client, the assets may transfer to the beneficiaries. For example, the business owner client discussed above may die before transferring her business interest, such that ownership of the business and the business accounts managed by the institution automatically transfer to her beneficiaries. The beneficiaries may sell their acquired business interest, individually or collectively, and transfer the money from the sale into a bank account, or the beneficiaries may transfer the business accounts to another financial institution.

Client data 106 may include any data regarding a client, an asset owned by the client, or a potential beneficiary of the asset. For example, client data 106 may include biographical information of a client, account information of a client, and biographical information of beneficiaries of the client that may receive a portion of or hold an interest in the balance of the account of the client. Client data 106 may be collected from internal sources, such as internally managed databases communicatively coupled to network 114, or from external sources, such as commercial or proprietary sources of information about the client, assets of the client, and/or beneficiaries of the client.

In some examples, client data 106 may include characteristics of the client. Characteristics of the client may include, for example, an age of the client, an address of the client, a customer experience rating provided by the client, financial plans of the client, income of the client, a planned retirement age of the client, a profession of the client, a risk profile of the client, a net worth of the client, and any other information related to the client. Characteristics of the client may come from a variety of sources including, for example, interviews with the client, financial plans provided by the client, public information regarding the client, and the like.

In some examples, client data 106 may include characteristics of the asset of the client. Characteristics of the asset of the client may include, for example, a value of the asset, a type or form of the asset, a geographic distribution of the asset, a liquidity of the asset, and any other information related to the assets of the client.

In some examples, client data 106 may include characteristics of the beneficiaries of the client. Characteristics of the beneficiaries may include, for example, a number of beneficiaries of the client, which may be negatively correlated with a likelihood of transfer; a geography of beneficiaries, the distribution of which may be positively correlated with a likelihood of transfer; whether a beneficiary has an account with the institution, which may be negatively correlated with a likelihood of transfer; and the like. Potential beneficiaries of the client may include any party that may receive a vested or contingent interest in an asset of the client including, but not limited to, a spouse, an heir, an institution, and the like.

In some examples, client data 106 may include characteristics of the institution with respect to the client. Characteristics of the institution may include, for example, a longevity of the relationship manager to the client, a longevity of the institution to the client, and the like.

In some examples, client data 106 includes values of various transfer factors derived from characteristics of the client, characteristics of the assets of the client, characteristics of the beneficiaries of the client, or characteristics of the institution. As discussed above, various characteristics of the client, characteristics of assets of the client, and/or characteristics of beneficiaries of the client may be predictive of the likelihood that a transfer of ownership of or interest in an asset to one or more beneficiaries will occur and/or that the transfer of the asset will result in a transfer of management of the asset away from the institution. Client data 106 may include values of these transfer factors that represent a degree or kind of the characteristics of the client, asset of the client, or beneficiaries of the client. For example, a client may transfer ownership of a brokerage account to one or more beneficiaries due to sickness or death. The one or more beneficiaries may decide to transfer a portion or all of the balance of the brokerage account to a different institution, such as due to location of the beneficiaries in different parts of the country or a preference of the beneficiaries for their own financial institutions. In this example, transfer factors closely associated with transfer of the bank account to beneficiaries, such as age of the client, and transfer factors closely associated with transfer of the balance of the bank account from the bank, such as distribution of beneficiaries, may be predictive of transfer of management of the balance of the bank account of the client from the bank. Transfer factors may include, but are not limited to: characteristics of the client, such as an age of the client (e.g., a positive correlation of transfer with a higher age), a number of beneficiaries of the client (e.g., a positive correlation of transfer with a lower number of beneficiaries, such as due to ease of transfer, or a positive correlation of transfer with a higher number of beneficiaries, such as due to greater fragmentation and likelihood of split interests), a completeness of client profile 104 of the client (e.g., a positive correlation of transfer with a lower completeness of client profile 104), and feedback from the client, such as a client satisfaction or loyalty indication; characteristics of an asset of the client, such as an account type of the asset, a change in a value or balance of the asset, a liquidity of the asset, or a revocability or terminality of a trust or other accounts; and characteristics of the beneficiaries of the client such as a geography of each of the beneficiaries of the client and whether an account of the beneficiary is managed by the institution; characteristics of the institution, such as retirement or departure of a relationship manager from the institution; and the like.

The values of transfer factors may be numerical values associated with the characteristics of the client, the asset of the client, or the beneficiaries of the client. For example, a value of a transfer factor may include: an age of a client divided by ten and rounded to a nearest whole number; a number of beneficiaries of the client such that one beneficiary=2, two beneficiaries=1, and more than two beneficiaries=0; a completeness of client profile 104 such that a complete profile=0, a profile that is in progress=1, and a profile that has not been started=2; and a geography of one or more beneficiaries such that multiple states or regions=1 and a single state or region=0.

In some examples, data from client data 106 may be mined and processed to determine the values of the transfer factors. For example, a server may process data from client data 106 to determine values of the transfer factors. In some examples, data from client data 106 may be selected and processed manually, such as by an advisor or other relationship manager, to determine values of the transfer factors. For example, the values of transfer factors may be integers that are representative of the transfer factors, such that a relationship manager of the client may input the value of the transfer factors from, for example, information collected during a client interview.

Administrator computer 108 may be associated with a financial institution including, for example, a bank. In some examples, administrator computer 108 may be a centralized computing device configured to execute risk assessment unit 110 and/or advisory unit 112 for evaluating a risk of asset transfer from the institution. Administrator computer 108 may comprise a cluster of one or more computers, workstations, servers, and the like. Administrator computer 108 configured to execute risk assessment unit 110 and/or advisory unit 112 may be physically or virtually included within an internal network of an organization. Alternatively, administrator computer 108 configured to execute risk assessment unit 110 and/or advisory unit 112 may be physically or virtually included in a network hosted by a third-party vendor. For example, a vendor of an organization may store and maintain risk assessment unit 110 and/or advisory unit 112 for an organization and/or may provide the functions of risk assessment unit 110 and/or advisory unit 112 as a service to the financial institution. In some examples, administrator computer 108 may be a computing device further from a centralized node of a network. For example, administrator computer 108 may be a computing device of an advisor, such that the advisor may execute risk assessment unit 110 and/or advisory unit 112 on command or periodically.

Risk assessment unit 110 running on administrator computer 108 may receive client data 106 from client profiles 104 of database 102. For example, administrator computer 108 may send a query to database 102 for client data 106 associated with values of various transfer factors. In response, database 102 may send client data 106 to risk assessment unit 110. In other examples, database 102 may send client data associated with values of various transfer factors to risk assessment unit 110 without a query, such as in real-time as client data 106 is updated or changes.

Risk assessment unit 110 may determine a likelihood of transfer of the asset from the institution based on client data 106. The likelihood of transfer of the asset may represent the predicted absolute or relative probability that an asset or group of assets will not be retained by the institution. In some examples, the likelihood of transfer of the asset may represent the predicted absolute or relative probability that an asset or group of assets will leave the institution within a period of time (e.g., five years). For example, client data 106 may indicate that a first client is about to retire and has few beneficiaries that are distributed across the country. Client data 106 may also indicate that a second client is further from retirement than the first client and has a large number of beneficiaries that live nearby. Based on this client data, the first client is more likely to transfer an asset out of the institution than the second client. The likelihood of transfer of the asset may be represented by a percentage, probability, score, relative score, or other measure of likelihood. Risk assessment unit 110 may include various models or algorithms that determine the likelihood of transfer of an asset of the client by using values of the transfer factors from client data 106. For example, the models or algorithms may use a weighting of each of the transfer factors that represents a relative influence of the respective transfer factor on the likelihood of the transfer of the asset from the institution.

Risk assessment unit 110 may determine a risk of transfer of the asset from the institution based on the likelihood of transfer of the asset and an asset value of the asset. For example, client data 106 may include values of the various assets of a client. A higher likelihood of transfer of the asset and/or a higher value of the asset may indicate a higher risk of transfer of the asset for the financial institution, such that addressing the client's financial needs regarding the asset may have a greater urgency. Using the example above, the second client, while having a lower likelihood of transferring assets from the institution, may have a greater value of assets, such that a financial risk to the institution of transfer of the assets of the second client may be greater than a financial risk to the institution of transfer of assets of the first client.

In some examples, risk assessment unit 110 receives client data periodically or in real time, such that risk assessment unit 110 may determine the risk of transfer of the asset periodically or in real-time. For example, as client data 106 is collected by risk assessment unit 110 from database 102, risk assessment unit 110 may determine the risk of transfer of the asset based on up-to-date values of transfer factors of the client.

Risk assessment unit 110 may output the risk of transfer of the asset to advisory unit 112. Advisory unit 112 running on administrator computer 108 may receive the risk of transfer of the asset from risk assessment unit 110. In some examples, advisory unit 112 may receive other information from risk assessment unit 110 related to the client, the asset of the client, or beneficiaries of the client, such as values of transfer factors.

Advisory unit 112 may be configured to determine an advisory action in response to receiving the risk of transfer of the asset. An advisory action may include any indication that is related to management of the asset of the client or the relationship with the client. Advisory actions may include, but are not limited to, warnings, potential advising opportunities, changes in client profiles 104, and the like.

In some examples, advisory unit 112 may be configured to evaluate and manage the risk of transfer of assets for multiple clients. For example, advisory unit 112 may receive data regarding risks of transfer of assets of various clients and process the data, such as through aggregation or prioritization. In some examples, advisory unit 112 may prioritize a potential advising opportunity of each of the plurality of clients based on the risk of transfer of the asset from the institution. A potential advising opportunity may be any opportunity of the financial institution to provide advice to the client regarding management of the asset, such as advice for a financial plan or potential opportunities within the institution for the asset, a derivative of the asset, or other assets of the client that are currently outside the institution. For example, advisory unit 112 may prioritize clients that have a higher risk of transfer of an asset over other clients and output an indication to a relationship manager of the priority of the various clients. Based on the determined priority, the relationship manager may focus resources on identifying and executing a potential advising opportunity, such as by prioritizing advising a client having a greater risk of transfer of assets.

In some examples, advisory unit 112 may determine a potential advising opportunity based on client data 106, such as values of the transfer factors. For example, the values of the transfer factors may indicate qualitative information related to a potential change in financial goals of the client, such as an approaching retirement. In this example, advisory unit 112 may determine that the client may be interested in wealth management opportunities such as establishment of a trust. Advisory unit 112 may output an indication of the potential advising opportunity to a relationship manager that includes the qualitative information related to the potential change in financial goals, such as potential topics of discussion with the client or potential tools for the advisory to use when assisting the client.

In some examples, advisory unit 112 may determine that a risk of transfer of an asset of a client has changed. For example, advisory unit 112 may receive risks of transfer of assets of clients periodically or in real-time. Advisory unit 112 may determine that the risk of transfer of an asset or a change in a risk of transfer of an asset has exceeded a threshold and output an indication to, for example, a relationship manager that the risk of the transfer of the asset has changed. In some examples, advisory unit 112 generates and outputs a periodic report that includes the changes in the risks of transfer of the assets of one or more clients.

In some examples, advisory unit 112 may use the risk of transfer of assets of various clients to predict a potential value of retaining the assets of the various clients. For example, the risk of transfer of assets may provide a snapshot to a financial institution as to a potential asset value managed by the institution and/or feedback of various advisory actions for retention of the assets of the client.

In some examples, advisory unit 112 may determine, for each of a plurality of clients, a projected value of retaining the asset. The projected value of retaining the asset may be a discounted or weighted value that takes into account the value of the asset and the likelihood that the asset will be retained the financial institution. Advisory unit 112 may determine a total projected value of retaining assets for the plurality of clients based on the projected value of retaining the assets for the plurality of clients.

In some examples, advisory unit 112 may output data related to the likelihood of transfer of the assets as feedback for advisory actions executed. For example, advisory unit 112 may track follow-through of advisory actions and corresponding changes to any of a likelihood of transfer of an asset, a risk of transfer of an asset, or a projected value in retaining an asset. Advisory unit 112 may illustrate an effect of the various advisory action on the likelihood of transfer of the assets, whether individually or in the aggregate, such that the financial institution may weigh the effectiveness of the various advisory actions.

The systems discussed herein, such as system 100 of FIG. 1, may extract, select, and quantify qualitative client data from a variety of sources to calculate a risk of transfer of one or more assets of a client from an institution. For example, an employee or computing system that receives limited information related to a client, such as a client age, may provide some information as to whether a client is likely to transfer ownership or vestment of an asset, but may provide little or no information as to whether the asset will be transferred from the institution upon or after transfer of the ownership or vestment.

In contrast, the systems described herein may extract, select, and quantify client data beyond basic biographical and account data of the client. For example, computer-based systems described herein may receive additional client data, such as beneficiary information related to a client, and utilize the additional client data in a multi-factorial analysis to more accurately determine whether transfer of ownership or vestment of the asset of the client will occur and/or whether that transfer will result in a transfer of management of the asset from the institution. Computer-based systems described herein may further provide guidance to the institution as to how to manage human resources of the institution to address the risk of transfer of the assets of the client. For example, computer-based systems described herein may prioritize potential advising opportunities among a large number of clients to improve retention of assets among a pool of clients. Computer-based systems described herein may also output display information related to the client data and/or guidance in various forms that may assist an employee of the institution in making informed decisions as to advising opportunities for the clients. For example, computer-based systems described herein may display client data or guidance in relative terms (e.g., as a priority list of the clients), aggregate terms (e.g., as a summation of asset retention values of the assets), and/or other forms more readily discernable to an employee (e.g., a spatial map of any information related to a risk of transfer of assets).

Figure 2:
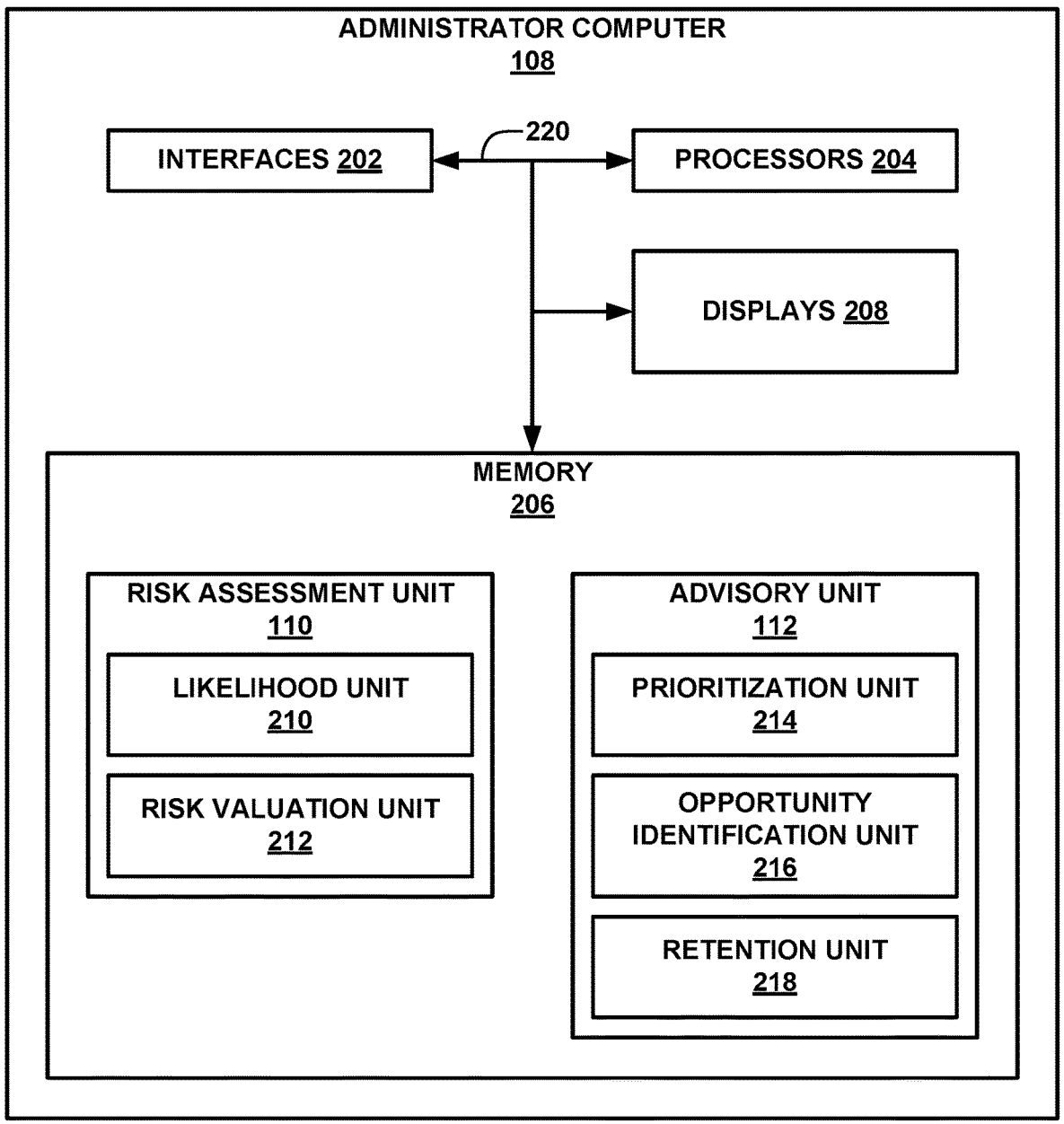
FIG. 2 is a block diagram illustrating an example administrator computer of FIG. 1 in further detail.

FIG. 2 is a block diagram illustrating the example administrator computer 108 of FIG. 1 in further detail. Administrator computer 108 may include interfaces 202, processors 204, memory 206, displays 208, and a communication bus 220.

Administrator computer 108 may include one or more interfaces 202 for allowing risk assessment unit 110 and advisory unit 112 to communicate with one or more databases (e.g., database 102), servers, devices and/or networks via one or more networks, e.g. network 114. The one or more interfaces 202 may include one or more network interface cards, such as Ethernet cards, and/or any other types of interface devices that can send and receive information. In some examples, risk assessment unit 110 and advisory unit 112 utilize the one or more interfaces 202 to communicate with database 102 and/or any other suitable device. Any suitable number of interfaces may be used to perform the described functions according to particular needs.

Administrator computer 108 may include one or more processors 204 configured to implement functionality and/or process instructions for execution within risk assessment unit 110 and advisory unit 112. Processors 204 may include, for example, microprocessors, digital signal processors (DSPs), application specific integrated circuits (ASICs), field-programmable gate arrays (FPGAs), and/or equivalent discrete or integrated logic circuitry.

Administrator computer 108 may include memory 206 configured to store information within administrator computer 108. Memory 206 may include a computer-readable storage medium or computer-readable storage device. In some examples, memory 206 may include one or more of a short-term memory or a long-term memory. Memory 206 may include, for example, random access memories (RAM), dynamic random access memories (DRAM), static random access memories (SRAM), magnetic hard discs, optical discs, floppy discs, flash memories, or forms of electrically programmable memories (EPROM), or electrically erasable and programmable memories (EEPROM). In some examples, memory 206 may store logic (e.g., logic of risk assessment unit 110 and advisory unit 112) for execution by one or more processors 204. In further examples, memory 206 may be used by risk assessment unit 110 and advisory unit 112 to temporarily store information during program execution.

Administrator computer 108 may include one or more displays 208 for displaying a graphical user interface (GUI) that may allow a user, e.g., a system administrator, to interact with administrator computer 108 by display of graphical icons and visual indicators. For example, displays 208 may present one or more GUIs that display client data 106 for client profiles 104, such as client profile 500 of FIG. 5 and client dashboard 600 of FIG. 6. In certain examples, any of the displays 208 may be a touch sensitive screen and may present one or more touch sensitive GUI elements. For example, a user may be able to interact with display 208 to respond to options displayed on display 208 and initiate an action by touching one or more of the touch sensitive GUI elements displayed on display 208. For example, display 208 may be a presence-sensitive display that displays a GUI and receives input from a user using capacitive, inductive, and/or optical detection at or near the presence sensitive display. Alternatively or in addition, a user may be able to interact with an input device to respond to options displayed on display 208 and initiate an action by using any suitable input device such as, for example, a keyboard, touchpad, and/or any other suitable input device. Display 208 may comprise a cathode ray tube (CRT) monitor, a liquid crystal display (LCD), organic light emitting diode (OLED), or any other type of display device that can generate intelligible output to a user.

Memory 206 may include risk assessment unit 110 and advisory unit 112 of FIG. 1. Risk assessment unit 110 and advisory unit 112 may include instructions executed by one or more processors 204 of administrator computer 108 to perform the functions of risk assessment unit 110 and advisory unit 112 as described herein. Risk assessment unit 110 and advisory unit 112 may receive client data retrieved from database 102 and/or any other suitable information for evaluating a risk of transfer of an asset from the institution and/or responding to a risk of transfer of the asset from the institution. Risk assessment unit 110 may access, via network 114, client data 106. For example, administrator computer 108 includes one or more interfaces 202 and may receive, by the one or more interfaces 202 and from database 102, client data 106. For example, administrator computer 108 may send a query to database 102, through the one or more interfaces 202, for client data 106. In response, database 102 may send client data 106 to risk assessment unit 110. In other examples, database 102 may send client data to risk assessment unit 110 without a query, such as in real-time as client data 106 is updated or changed.

In operation, according to aspects of this disclosure, risk assessment unit 110 and advisory unit 112 may be used to predict potential transfers of management of assets from an institution and prioritize responses to the predicted potential transfers based on the risk to the institution of losing the particular assets. In the example of FIG. 2, risk assessment unit 110 includes likelihood unit 210 and risk valuation unit 212, while advisory unit 112 includes priority unit 214, opportunity identification unit 216, and retention unit 218. In other examples, however, risk assessment unit 110 and/or advisory unit 112 may include greater or fewer units than described in FIG. 2.

Likelihood unit 210 may determine a likelihood of transfer of the asset from the institution based on client data 106. As explained in FIG. 1, the likelihood of transfer of the asset may represent the predicted absolute or relative probability that an asset or group of assets will not be retained by the institution, such as within a period of time. The likelihood of transfer of the asset may be represented by a percentage, probability, score, relative score, or other measure of likelihood.

In some examples, likelihood unit 210 may be configured to determine the likelihood of transfer of the asset using a parameterized model. For example, as described in FIG. 1, client data 106 may include characteristics of the client, characteristics of assets of the client, or characteristics of beneficiaries of the client that are particularly predictive of the likelihood that an asset or group of assets will be transferred from the institution. The values of these various transfer factors may be inputs to the parameterized model.

In some examples, likelihood unit 210 may be configured to determine the values of the various transfer factors from client data 106. Likelihood unit 210 may receive client data 106 that originates from a variety of sources, such that client data 106 may be standardized for use in the parameterized model. Likelihood unit 210 may analyze the received client data 106 to identify client data 106 corresponding to the transfer factors and determine values for the identified client data 106. For example, likelihood unit 210 may scan the received client data 106 for key words or numbers to identify the transfer factors in client data 106. Based on the content or context of the identified transfer factors, likelihood unit 210 may determine the values of the transfer factors by using a set of rules to score the transfer factors. In other examples, client data 106 may include values of transfer factors of client data 106. For example, a relationship manager may have previously input various integer values for the transfer factors according to a set of rules and likelihood unit 210 may look up the integer values, such as in a table.

As an extended example, likelihood unit 210 may receive client data that includes a standardized report of client data generated by a relationship manager during an interview and that includes predetermined values of transfer factors input or selected by the relationship manager. To determine the values of the various transfer factors, likelihood unit 210 may look up the values of the transfer factors from the report. For example, likelihood unit 210 may look up a "1" value that corresponds to an incomplete profile of the client, a "1" value that corresponds to possession of a brokerage account of a beneficiary of the client with the institution, and a "7" value that corresponds to an age (72) of a client. Likelihood unit 210 may also receive client data that includes biographical information of beneficiaries obtained from public databases and that does not include predetermined values of transfer factors. Likelihood unit 210 may scan the biographical information for content, context, and/or completeness, identify transfer factors from the scanned information, such as through feature recognition, and assign values to the identified transfer factors, such as through rules or conversion tables. For example, likelihood unit 210 may identify two beneficiaries of the client and score the two beneficiaries with a corresponding "1" value, and may identify that the two beneficiaries live in two different states and score the geography of the beneficiaries with a corresponding "1" value.

In some examples, likelihood unit 210 may determine an urgency score that represents a quantification of the likelihood of transfer of the asset. The urgency score may be used as an absolute or relative metric, such as by a relationship manager for the particular client to guide an advisory action, or may be used to determine other information related to a potential transfer of the assets, as will be explained below. In some examples, likelihood unit 210 may determine the urgency score based on the values of the transfer factors and a weighting for each of the transfer factors. For example, as explained above, likelihood unit 210 may include various parameterized models that determine the likelihood of transfer of an asset of the client by using the values of the transfer factors from client data 106. While the values of the transfer factors may reflect a quantitative or qualitative assessment of the transfer factors, such as for purposes of simplification (e.g., integers) or standardization (e.g., determined by user or machine), they may not reflect a relative influence of each transfer factor on the likelihood of transfer. For example, an age of a client may be more predictive of a potential transfer than a change in geography of a client of a national financial institution. In some examples, the models or algorithms may use a weighting of each of the transfer factors that represents a relative influence of the respective transfer factor on the likelihood of the transfer of the asset from the institution. The weighting for the transfer factors may be determined by, for example, analyzing historical client data and adjusting the weighting to closer match the outcomes that correspond to the historical client data. For example, a first category of clients having a first set of characteristics (e.g., demographic, geographic, etc.) may have a first weighting for the transfer factors, while a second category of client having a second set of characteristics may have a second weighting for the transfer factors.

Continuing with the extended example above, likelihood unit 210 may include an algorithm that weights an age of a client to 0.35, a completeness of client profile to 0.25, a number of beneficiaries to 0.15, a geography of beneficiaries to 0.15, and possession of an account of a beneficiary to 0.1. Based on the values of the transfer factors discussed above and their weightings, likelihood unit 210 may assign urgency sub-scores to each of the transfer factors, including an age score of 2.45 (7×0.35), a completeness score of 0.25 (1×0.25), a number of beneficiaries score of 0.15 (1×0.15), a geography of beneficiaries score of 0.15 (1×0.15), and an account score of 0.1 (1×0.1). Likelihood unit 210 may add up the various sub-scores to determine an urgency score of 3.1 for the client. The urgency score of 3.1 for the client may represent a higher predicted likelihood of transfer of that client's assets than an urgency score of, for example, 2.5 for a different client.

Risk valuation unit 212 may determine a risk of transfer of the asset from the institution based on the likelihood of transfer of the asset and an asset value of the asset. For example, client data 106 may include values of the various assets of a client. A higher likelihood of transfer of the asset and/or a higher value of the asset may indicate a higher risk of transfer of the asset for the financial institution, such that addressing the client's financial needs regarding the asset may have a greater urgency.

In some examples, risk valuation unit 212 may determine a priority score that represents the risk of transfer of the at least one asset from the institution. Risk valuation unit 212 may determining the priority score based on the likelihood of transfer of the at least one asset, such as represented by the urgency score described above, and the asset value of the at least one asset. For example, risk valuation unit 212 may aggregate values of assets associated with a client and multiply the aggregated values of assets with the urgency score for the client.

Continuing with the extended example above, risk valuation unit 212 may receive client data regarding values of assets under management that indicate $400,000 in real estate, $50,000 in a savings account, and $50,000 in a trust, and determine the value of the assets at $500,000. Risk valuation unit 212 may multiply the value of the assets ($500,000) and the urgency score (3.1) for the client to determine the priority score of the client at 1,550,000.

In some examples, risk assessment unit 110 receives client data periodically or in real time, such that likelihood unit 210 may determine the likelihood of transfer of the asset and/or risk valuation unit 212 may determine the risk of transfer of the asset periodically or in real-time. For example, as client data 106 is collected by risk assessment unit 110 from database 102, likelihood unit 210 may determine the likelihood of transfer of the asset based on up-to-date values of transfer factors of the client and/or risk valuation unit 212 may determine the risk of transfer of the asset based on up-to-date values of the assets.

In the example of FIG. 2, advisory unit 112 includes prioritization unit 214, opportunity identification unit 216, and retention unit 218. Any of prioritization unit 214, opportunity identification unit 216, and/or retention unit 218 may receive the risk of transfer of the asset from risk assessment unit 110 and/or other information from risk assessment unit 110 related to the client, the asset of the client, or beneficiaries of the client, such as values of transfer factors, urgency scores, priority scores, or values of assets.

In some examples, prioritization unit 214 may receive information regarding the risk of transfer of assets of a plurality of clients and prioritize a potential advising opportunity of each of the plurality of clients based on the risk of transfer of the asset from the institution. A potential advising opportunity of a client may represent an action or collection of actions available to the institution to affect the relationship of the institution with the client. In some examples, prioritization unit 214 may operate such that prioritizing a particular relationship between the institution and the client may correspond to prioritizing a potential advising opportunity of the particular client that includes one or more potential actions. For example, a potential advising opportunity may include one or more opportunities of the financial institution to collect information from (e.g., request information related to client profile 104) or provide information or advice to (e.g., check-in with client or advise client as to investment goals) the client regarding management of the asset. Advising opportunities include, but are not limited to, actions related to financial planning, such as for a client that may want to consider various investments; long-term goal planning, such as for a client that may want to change financial goals; business exit planning, such as for a client that may want to sell a business; family transfer planning, such as for a client that may want to transfer assets to a family member; estate planning, such as for a client that may want to retain control of assets for a period of time; retirement planning, such as for a client at or near planned retirement, a client wishing to retire earlier than planned, or a client wishing to retire later than planned; and the like. These advising opportunities may involve a substantial amount of analysis, follow-up, and management, such that a relationship manager for a plurality of clients may benefit from addressing needs of the plurality of clients by prioritizing clients.

In some examples, prioritization unit 214 may receive a priority score for each client of a plurality of clients and prioritize each particular client and/or one or more potential advising opportunities of each client based on the priority scores of the plurality of clients. Prioritization unit 214 may order the potential advising opportunity of each of the plurality of clients in comparison to the plurality of clients based on the priority score of each client, such as in descending order. The resulting prioritized representation of the plurality of clients, such as a listing of the clients and associated potential advising opportunities of the clients on displays 208, may represent a relative importance of pursuing the potential advising opportunity with a particular client with respect to pursuing potential advising opportunities of other clients. In some examples, prioritization unit 214 may classify the potential advising opportunities, such as in tiers. For example, a potential advising opportunity of a client in a first tier may be more valuable to the financial institution than a potential advising opportunity of a client in a second tier, such that a relationship manager may prioritize pursuing the potential advising opportunities in the first tier before pursuing potential advising opportunities in the second tier.

Continuing with the extended example above, prioritization unit 214 may receive the priority score of the example client (1,550,000) and priority scores of other clients (e.g., client 1 at 2,000,000, client 2 at 1,000,000, and client 3 at 1,500,000). Prioritization unit 214 may use the respective priority scores of the clients to prioritize potential advising opportunities in descending priority for client 1, the example client, client 3, and client 2, in that order. Prioritization unit 214 may display the prioritized potential advising opportunities, such as on a GUI on displays 208, such that the relationship manager of the plurality of clients may view the prioritized potential advising opportunities and make informed decisions as to which potential advising opportunities to pursue and in which order.

In some examples, prioritization unit 214 may determine that a risk of transfer of an asset of a client has changed. For example, prioritization unit 214 may receive updated risks of transfer of assets of clients periodically or in real-time. In some examples, prioritization unit 214 may determine whether the risk of transfer of an asset or a change in a risk of transfer of an asset has exceeded a threshold. In response to determining that the risk of transfer or change in the risk of transfer exceeds the threshold, prioritization unit 214 may output an indication to, for example, a relationship manager that the risk of the transfer of the asset has changed. In some examples, prioritization unit 214 may determine whether a priority of a client has changed, such as due to a change in the value of a transfer factor or value of an asset of the client. In response to determining that the priority of the client has changed, prioritization unit 214 may output an indication to, for example, the relationship manager that the priority of the potential advising opportunity for the client has changed. In some examples, advisory unit 112 generates and outputs a periodic report that includes the changes in the risks of transfer of the assets of one or more clients and/or the changes in priorities of potential advising opportunities of the one or more clients.

Continuing with the extended example above, prioritization unit 214 may receive the priority score of the client every week and compare it to a threshold that represents an importance of the client. Prioritization unit 214 may determine that the priority score (1,550,000) exceeds a "moderate importance" threshold (e.g., 1,500,000), but does not exceed a "high importance" threshold (e.g., 3,000,000). If, during a weekly report, a value of the real estate of the client is assessed at a lower value, such as $350,000 for a priority score of 1,395,000, prioritization unit 214 may output an alert to the relationship manager responsible for the client that the priority score no longer exceeds a "moderate importance" threshold.

In some examples, such as examples in which one or more potential advising opportunities for one or more clients in a prioritized plurality of clients have not been identified, opportunity identification unit 216 may receive client data 106 and determine one or more potential advising opportunities for a client based on client data 106, such as for a client in a prioritized plurality of clients from prioritization unit 214. In some examples, characteristics of the client, assets of the client, beneficiaries of the client, or completeness of client data 106 may include information as to a type of potential advising opportunity that may be appropriate for the client. Opportunity identification unit 216 may use client data 106 to select one or more potential advising opportunities to strengthen a relationship with the client and reduce the likelihood of transfer of an asset of the client from the institution. In some examples, the values of the transfer factors may indicate qualitative information related to a potential change in financial goals of the client. For example, an age of a client and a type of account may indicate that a client is near retirement and likely to convert assets to a retirement account. Opportunity identification unit 216 may receive values of transfer factors for a prioritized plurality of clients and select various potential advising opportunities related to the values of the transfer factors for each of the plurality of clients. For example, a particular potential advising opportunity may be associated with a threshold of a value of a transfer factor, such that opportunity identification unit 216 may identify a potential advising opportunity by determining that the value of the transfer factor exceeds the threshold.

Continuing with the extended example above, opportunity identification unit 216 may receive client data from the client, (e.g., from risk assessment unit 110 or database 102) that includes values of transfer factors, such as an age of the client ("7") and other characteristics of the asset of the client, such as a form of the assets under management (real estate, bank account, and trust). Based on the received client data, opportunity identification unit 216 may determine that the value for an age of the client indicates a potential retirement, that the presence of the real estate indicates an asset likely to be liquidated, and that the presence of beneficiaries and a trust indicates a potential interest in beneficiaries. Based on these indications, opportunity identification unit 216 may determine various potential advising opportunities related to retirement planning, estate planning, and family transfer planning.

Opportunity identification unit 216 may output an indication of the potential advising opportunity to a relationship manager. For example, the indication of the potential advising opportunity may include the qualitative information related to the potential change in financial goals, information that the relationship manager should seek to acquire before or during an interview with the client, and the like.

In some examples, retention unit 218 may receive the likelihood or risk of transfer of assets of various clients to predict a potential value of retaining the assets of the various clients. For example, the risk of transfer of assets may provide a snapshot to a financial institution as to a potential asset value managed by the institution and/or feedback of pursuing various advisory actions, such as advising opportunities, for retention of the assets of the client.

In some examples, retention unit 218 may determine, for each of a plurality of clients, a projected value of retaining the assets of the client. The projected value of retaining the asset may be a discounted or weighted value that takes into account the value of the asset and the likelihood that the asset will be retained the financial institution. Retention unit 218 may determine a total projected value of retaining assets for the plurality of clients based on the projected value of retaining the asset for each of the plurality of clients.

In some examples, retention unit 218 determines an asset retention score that represents a projected value of retaining the assets of the client. In some examples, retention unit 218 receives an urgency score (or other measure of likelihood of transfer of the assets) and asset value for each client of the plurality of clients and determines an asset retention score based on the urgency score and the asset value. For example, retention unit 218 may convert an urgency score of the client into a probability of the assets of the client being retained by the institution, such as by using a conversion factor based on historical feedback of asset retention. Retention unit 218 may multiply the probability of the asset being retained by the institution with the value of the asset to determine the asset retention score.

Continuing with the extended example above, retention unit 218 may receive the urgency score (3.1) for the client and the value of the assets of the client ($500,000). Retention unit 218 may convert the urgency score or portions of the urgency score (e.g., urgency sub-scores relating to age, number of beneficiaries, etc.) into a probability of the institution retaining the assets for five years using, for example, a schedule of urgency scores to probabilities. Based on the schedule, retention unit 218 may determine that the probability of retaining the asset for five years is, for example, 50% with follow-up action regarding potential advising opportunities and 40% without follow-up action regarding potential advising opportunities. Retention unit 218 may determine an asset retention score of $250,000 with follow-up and $200,000 without follow-up. While the asset retention score of the client may not indicate a value of an asset retained by the institution at the end of five years for the particular client (e.g., it may be likely to either retain all assets at $500,000 or retain no assets at $0), the asset retention scores of a plurality of clients may be used in the aggregate to project a total asset retention score, as will be explained below.

In some examples, retention unit 218 may receive or determine an asset retention score for each of a plurality of clients and determine a total asset retention score of the plurality of clients based on the asset retention score for each of the plurality of clients. For example, retention unit 218 may add up the asset retention scores for a plurality of clients to determine the total asset retention score. The total asset retention score may represent a projected value of retaining the plurality of clients.

Continuing with the extended example above, retention unit 218 may receive the asset retention score of the example client with ($250,000) and without ($200,000) follow-up action, as well as retention scores from client 1 (e.g., $500,000 with and $400,000 without follow-up action), client 2 (e.g., $200,000 with and $150,000 without follow-up action), and client 3 (e.g., $300,000 with and $200,000 without follow-up action). Retention unit 218 may determine that the total asset retention score of the plurality of clients is $1.25 million with follow-up action and $950,000 without follow-up action.

In some examples, retention unit 218 may output data related to the likelihood of transfer of the assets of the client as feedback for advisory actions executed with respect to the client, such as projected or historical outcomes in which a relationship manager has or has not followed through on a potential advising opportunity for the client. For example, retention unit 218 may track follow-up of potential advising opportunities and corresponding changes to any of a likelihood of transfer of an asset, a risk of transfer of an asset, or a projected value in retaining an asset. In some examples, retention unit 218 may illustrate an effect of the various advisory actions on the likelihood of transfer of the assets, whether individually or in the aggregate, such that the financial institution may weigh the effectiveness of the various advisory actions. For example, retention unit 218 may output asset retention scores with and without follow-up side by side for comparison by a relationship manager, or in the aggregate to illustrate an effect of follow-up by relationship managers for the plurality of clients.

Continuing with the extended example above, retention unit 218 may track whether assets of the example client, as well as assets of clients 1, 2, and 3, are retained by the institution. If all of the assets of the example client ($500,000) and client 2 (e.g., $400,000), and part of the assets of client 3 (e.g., $100,000) are retained, all with follow-up action, retention unit 218 may determine that at least one of the weightings of the transfer factors, probability schedules, or other parameter that is used to determine an urgency score, priority score, or asset retainment score of one or more clients may require adjusting. In response to this determination, retention unit 218 may adjust one or more corresponding parameters.

Figure 3:
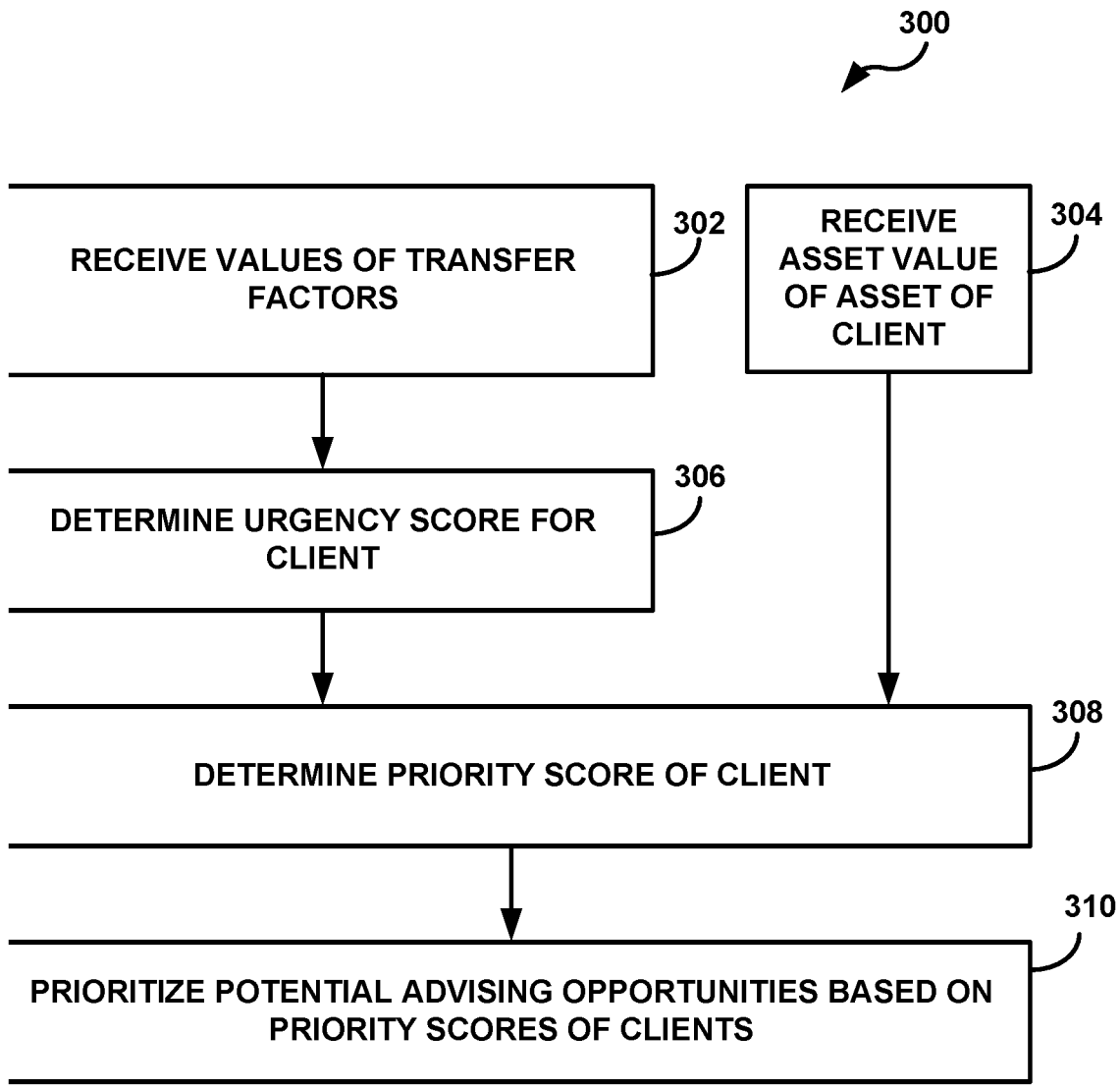
FIG. 3 is a flowchart illustrating an example operation of an administrator computer of FIG. 1, in accordance with the techniques of this disclosure.

FIG. 3 is a flowchart illustrating an example operation 300 of risk assessment unit 110 and advisory unit 112 running on administrator computer 108 of the system 100, in accordance with the techniques of this disclosure. Risk assessment unit 110 may receive values of transfer factors (302) and asset values of assets for each of a plurality of clients (304). For example, risk assessment unit 110 may receive client data 106 from client profiles 104 of database 102 that includes the values of transfer factors and the asset values of the client. In some examples, risk assessment unit 110 may receive client data as it is created.

Risk assessment unit 110 may determine an urgency score for each of the plurality of clients (306). The urgency score represents the likelihood of transfer of the assets from the institution. The urgency score may be determined based on the values of the transfer factors and a weighting for each of the transfer factors. The weighting of each of the transfer factors represents a relative influence of the respective transfer factor on the likelihood of the transfer of the at least one asset from the institution. For example, risk assessment unit 110 may multiply the values of the transfer factors with the weightings of the transfer factors to determine an urgency sub-score that corresponds to the particular transfer factor. Risk assessment unit 110 may add the urgency sub-scores to determine the urgency score.

Risk assessment unit 110 may determine a priority score for each of the plurality of clients (308). The priority score represents the risk of transfer of the at least one asset from the institution. The priority score may be determined based on the urgency score of the client and an asset value of the assets of the client. For example, risk assessment unit 110 may determine the priority score by multiplying the urgency score for the particular client with asset values of the assets of the particular client.

Risk assessment unit 110 may prioritize a potential advising opportunity of each of the plurality of clients based on the risk of transfer of the at least one asset from the institution as represented by the priority score (310). For example, risk assessment unit 110 may order a plurality of clients of each of the plurality of clients in comparison to the plurality of clients based on the priority score. Risk assessment unit 110 may determine (e.g., identify and select) one or more potential advising opportunities for each client of the prioritized plurality of clients and output a prioritized list of the one or more potential advising opportunities, such as to a display for a relationship manager of the institution.

Figure 4:
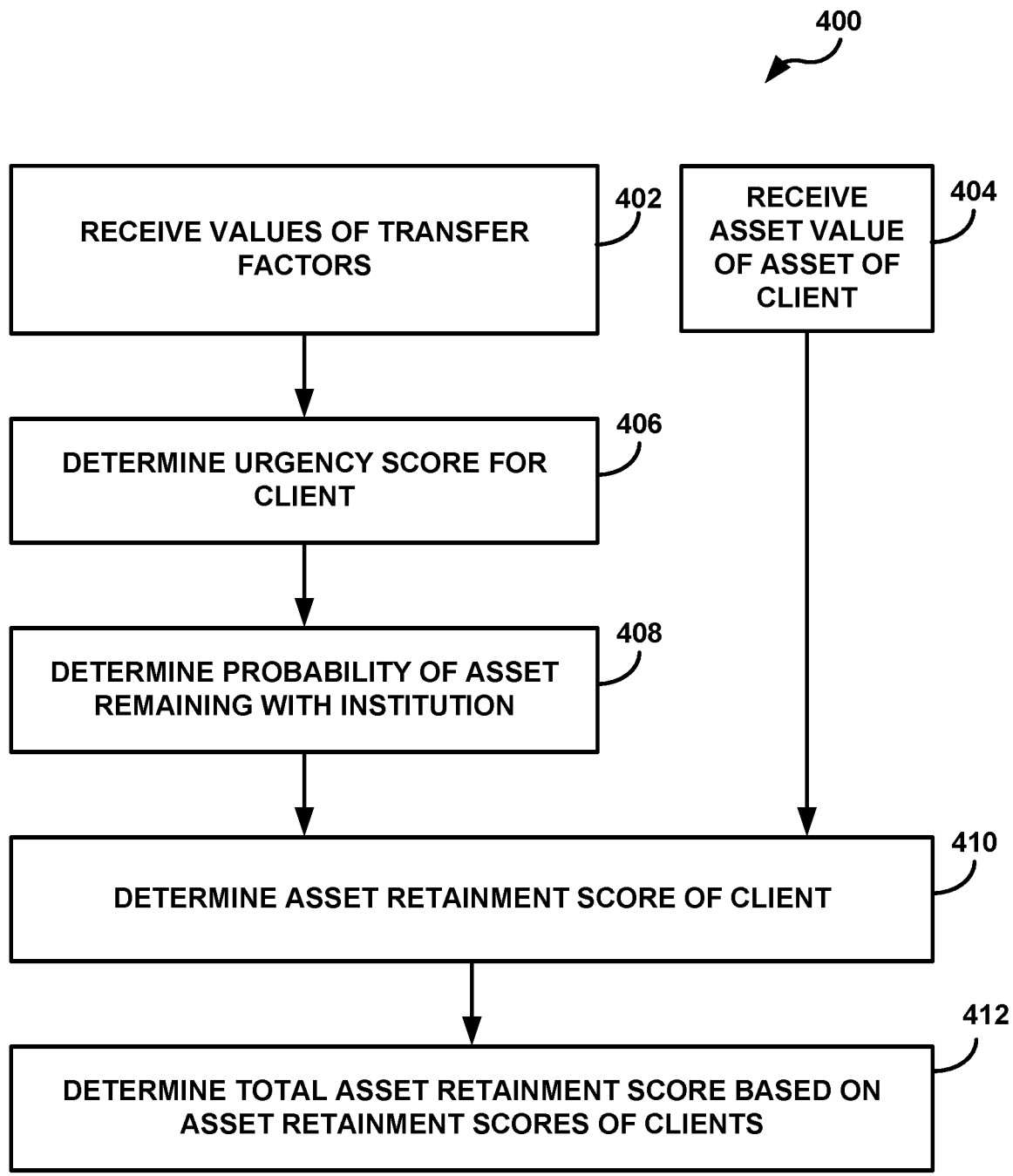
FIG. 4 is a flowchart illustrating an example operation of an administrator computer of FIG. 1, in accordance with the techniques of this disclosure.

FIG. 4 is a flowchart illustrating an example operation 400 of risk assessment unit 110 and advisory unit 112 running on administrator computer 108 of the system 100, in accordance with the techniques of this disclosure. Steps 402, 404, and 406 may correspond to steps 302, 304, and 306 of FIG. 3, respectively. Advisory unit 112 may determine a probability of retaining assets of the client by the institution (408). For example, advisory unit 112 may receive the urgency for the client and convert the urgency score to a probability of retaining the assets of the client, such as through an algorithm or table. Advisory unit 112 may determine an asset retention score for each of the plurality of clients (410). The asset retention score represents a projected value of retaining the at least one asset. The asset retention score is based on the probability of retaining the asset and the asset value of the at least one asset. For example, advisory unit 112 may determine the asset retention score for a client by multiplying the probability of retaining the asset with the asset value of the asset. Advisory unit 112 may determine a total asset retention score of the plurality of clients based on the asset retention score for each of the plurality of clients (412). For example, advisory unit 112 may aggregate the asset retention scores for the plurality of clients.

Figure 5:
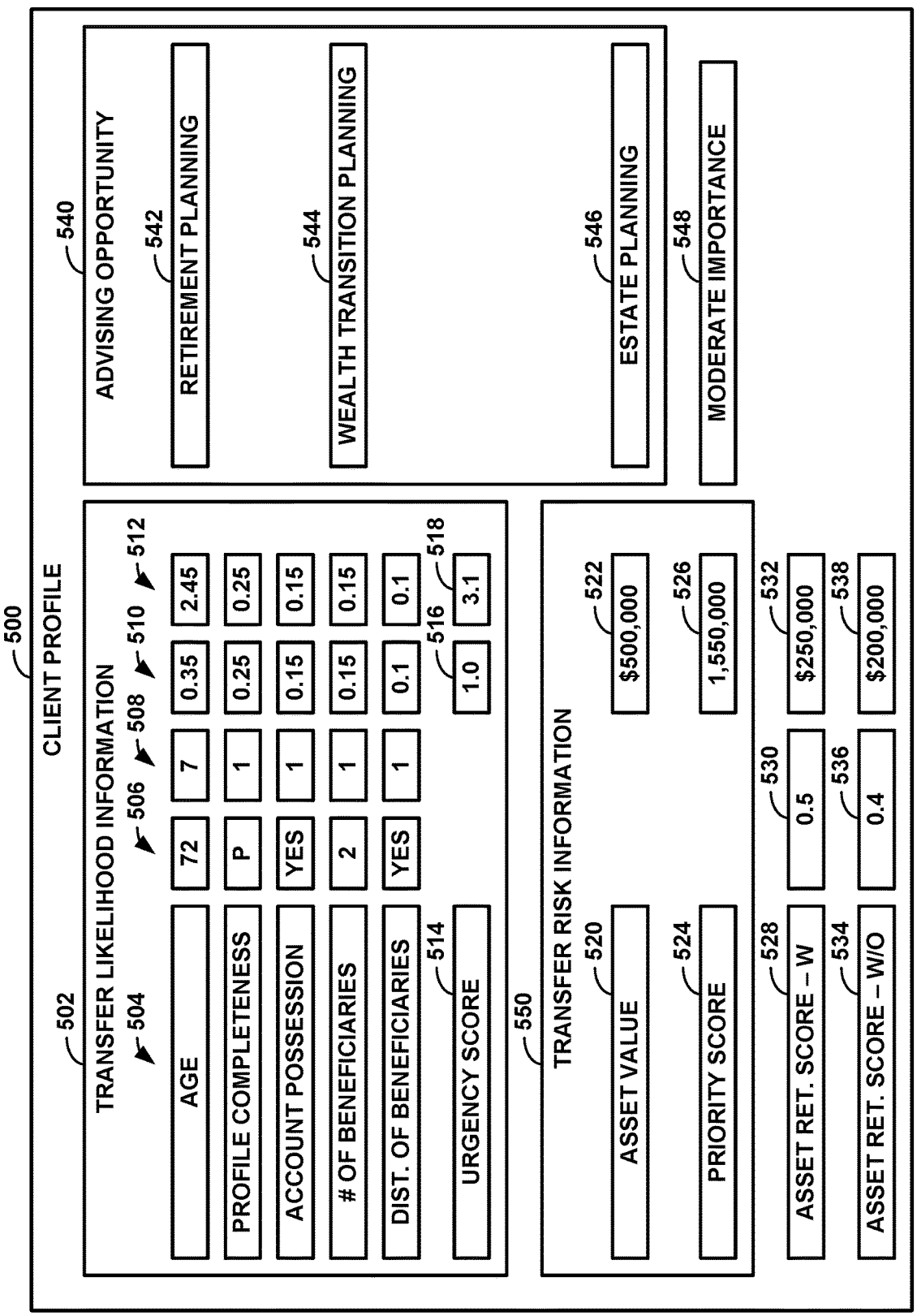
FIG. 5 is a diagram of an example graphical user interface of a client profile.

In some examples, any of likelihood unit 210, risk evaluation unit 212, prioritization unit 214, opportunity identification unit 216, and/or retention unit 218 may output, such as to displays 208, any information or data received or determined by the corresponding component. FIG. 5 is a diagram of an example graphical user interface for a client profile 500, such as one of client profiles 104 of FIG. 1. For illustration purposes, information in client profile 500 corresponds to the extended example discussed in FIG. 2. Client profile 500 may be displayed, for example, on displays 208, such as for a relationship manager responsible for a client.

In the example of FIG. 5, client profile 500 includes transfer likelihood information 502. Transfer likelihood information 502 may include transfer factors 504, qualitative or quantitative information 506 related to transfer factors 504, values 508 of transfer factors based on qualitative or quantitative information 506, weightings 510 of transfer factors (e.g., that add up to a weighting total 516), and urgency sub-scores 512 of transfer factors. The various urgency sub-scores 512 may be added to determine a value 518 for an urgency score 514 of the client. For example, a transfer factor for an age of the client ("AGE") includes quantitative age information ("72") that corresponds to a value of the transfer factor ("7"). The value of the transfer factor ("7") is multiplied by the weighting ("0.35") to determine an urgency sub-score for the age of the client ("2.45").

Client profile 500 includes transfer risk information 550. Asset value information 520 includes an asset value 522 for the client. Urgency score information 514 and asset value information 520 may be used to determine priority score information 524, including a value of the priority score 526. Priority score information 524 may also be associated with a classification 548 of the value of the priority score ("MODERATE IMPORTANCE"). Urgency score information 514 and asset value information 520 may also be used to determine asset retention score information with follow-up action 528, associated with a probability 530 and asset retention score value 532, and asset retention score information without follow-up action 534, associated with a probability 536 and asset retention score value 538.

Client profile 500 includes advising opportunity information 540 associated with various transfer factors 504. In this example, advising opportunity information includes an age-related advising opportunity 542 ("RETIREMENT PLANNING"), a number-of-beneficiaries-related advising opportunity 544 ("WEALTH TRANSITION PLANNING"), and an asset-related advising opportunity 546 ("ESTATE PLANNING").

Figure 6:
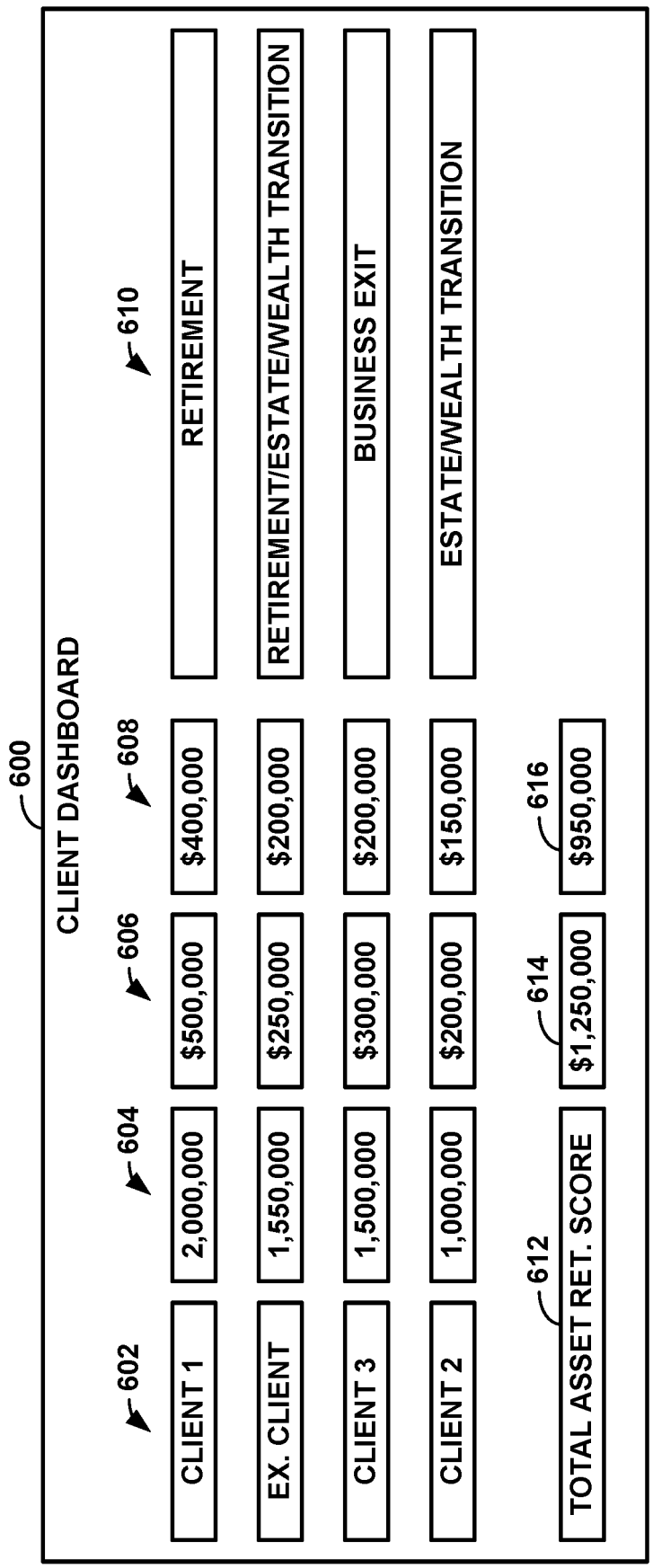
FIG. 6 is a diagram of an example graphical user interface of a client dashboard.

FIG. 6 is a diagram of an example graphical user interface of a client dashboard 600 that includes information related to client prioritization, advising opportunity identification, and asset retention determination. For illustration purposes, information in client dashboard 600 corresponds to the extended example discussed in FIG. 2. Client dashboard 600 may be displayed, for example, on displays 208, such as for a relationship manager responsible for a plurality of clients.

Client dashboard 600 includes an identity of a client 602, a value of a priority score of a client 604, an asset retention score of the client with follow-up 606, an asset retention score of the client without follow-up 608, and potential advising opportunity information for the client 610. For example, the client dashboard information for the example client ("EX. CLIENT") may be taken from the client profile 500 of FIG. 5. Client dashboard 600 may also include total asset retention score information 612 for selected clients that corresponds to a total asset retention score value with follow-up action 614 and a total asset retention score value without follow-up action 616.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over a computer-readable medium as one or more instructions or code, and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
    dynamically updating, by one or more processors of a computing device and for each of a plurality of clients, client data by:
        receiving, by the one or more processors, a first set of the client data, wherein each of the plurality of clients owns at least one asset held by an institution, wherein the first set of the client data includes values of a first set of transfer factors related to at least one of transfer of at least a portion of the asset to one or more beneficiaries of the client and transfer of management of the portion of the asset from the institution by the one or more beneficiaries;
        periodically querying, by the one or more processors, one or more databases for an asset value of the at least one asset and one or more public databases for a second set of the client data, wherein the second set of the client data includes a second set of transfer factors related to transfer of management of the portion of the asset from the institution by the one or more beneficiaries, wherein the second set of transfer factors includes biographical information of the one or more beneficiaries of the client;
        receiving, by the one or more processors and from the one or more databases, the second set of transfer factors; and
        parameterizing, by the one or more processors, the second set of transfer factors to determine respective values of the second set of transfer factors by:
            scanning the biographical information;
            identifying, using feature recognition, the second set of transfer factors from the scanned information; and
            assigning values to the identified second set of transfer factors;
    prioritizing, by the one or more processors and based on the dynamically updated client data, potential advising opportunities of the plurality of clients by:
        determining, by the one or more processors and for each of the plurality of clients, an urgency score based on the values of the transfer factors of the first and second sets of transfer factors and a weighting for each of the transfer factors of the first and second sets of transfer factors, wherein the weighting of each of the transfer factors of the first and second sets of transfer factors represents a relative influence of the respective transfer factor on a likelihood of transfer of the at least one asset from the institution, wherein the weighting of the transfer factors of the first and second sets of transfer factors comprises a first weighting associated with a first set of characteristics and a second weighting associated with a second set of characteristics, and wherein determining the urgency score based on the values of the transfer factors of the first and second sets of transfer factors and the weighting for each of the transfer factors of the first and second sets of transfer factors further comprises:
            determining, by the one or more processors and for each of a first portion of the plurality of clients having the first set of characteristics, the urgency score based on the values of the transfer factors of the first and second sets of transfer factors and the first weighting; and
            determining, by the one or more processors and for each of a second portion of the plurality of clients having a second set of characteristics, the urgency score based on the values of the transfer factors of the first and second sets of transfer factors and the second weighting;
        determining, by the one or more processors and for each of the plurality of clients, a priority score based on the urgency score and the asset value of the at least one asset, wherein the priority score represents a risk of transfer of the at least one asset from the institution;
    outputting, by the one or more processors, a prioritized representation that includes a potential advising opportunity of each of the plurality of clients based on the priority score; and
    in response to detecting a change in at least one transfer factor of the first or second sets of transfer factors for a respective client of the plurality of clients, updating, by the one or more processors, the prioritized representation based on an updated priority score of the respective client.

2. The method of claim 1, wherein the client data of the first or second sets of client data includes data regarding characteristics of at least one of the client, the at least one asset of the client, and one or more beneficiaries of the client.

3. The method of claim 1, wherein the transfer factors of the first or second sets of transfer factors include at least one of an age of the client, a number of beneficiaries of the client, a completeness of a profile of the client by the institution, a geography of the beneficiaries of the client, and an account type of the asset of the client.

4. The method of claim 1, further comprising determining the potential advising opportunity of each of the plurality of clients based on the values of the transfer factors of the first and second sets of transfer factors.

5. The method of claim 1, wherein prioritizing the potential advising opportunity of each of the plurality of clients further comprises:
    ordering, by the one or more processors, the potential advising opportunity of each of the plurality of clients in comparison to the plurality of clients based on the priority score.

6. The method of claim 1, further comprising:
    determining, by the one or more processors and for each of the plurality of clients, an asset retention score based on a probability of retaining the at least one asset and the asset value of the at least one asset, wherein the asset retention score represents a projected value of retaining the at least one asset; and determining, by the one or more processors, a total asset retention score of the plurality of clients based on the asset retention score for each of the plurality of clients.

7. A computing device comprising:
one or more storage units; and
one or more processors in communication with the one or more storage units and configured to:
dynamically update, for each of a plurality of clients, client data by:
receiving, for each of a plurality of clients, a first set of the client data, wherein each of the plurality of clients owns at least one asset held by an institution, wherein the first set of the client data includes values of a first set of transfer factors related to at least one of transfer of at least a portion of the asset to one or more beneficiaries of the client and transfer of management of the portion of the asset from the institution by the one or more beneficiaries;
periodically querying one or more databases for an asset value of the at least one asset and one or more public databases for a second set of the client data, wherein the second set of the client data includes a second set of transfer factors related to transfer of management of the portion of the asset from the institution by the one or more beneficiaries, wherein the second set of transfer factors includes biographical information of the one or more beneficiaries of the client;
receiving, from the one or more databases, the second set of transfer factors for each of the plurality of clients;
parameterizing the second set of transfer factors to determine respective values of the second set of transfer factors by:
scanning the biographical information;
identifying, using feature recognition, the second set of transfer factors from the scanned information; and
assigning values to the identified second set of transfer factors;
prioritize, by the one or more processors and based on the dynamically updated client data, potential advising opportunities of the plurality of clients by:
determining, for each of the plurality of clients, an urgency score based on the values of the transfer factors of the first and second sets of transfer factors and a weighting for each of the transfer factors of the first and second sets of transfer factors, wherein the weighting of each of the transfer factors of the first and second sets of transfer factors represents a relative influence of the respective transfer factor on a likelihood of transfer of the at least one asset from the institution, wherein the weighting of the transfer factors of the first and second sets of transfer factors comprises a first weighting associated with a first set of characteristics and a second weighting associated with a second set of characteristics, and wherein determining the urgency score based on the values of the transfer factors of the first and second sets of transfer factors and the weighting for each of the transfer factors of the first and second sets of transfer factors further comprises:
determining, for each of a first portion of the plurality of clients having the first set of characteristics, the urgency score based on the values of the transfer factors of the first and second sets of transfer factors and the first weighting; and
determining, for each of a second portion of the plurality of clients having a second set of characteristics, the urgency score based on the values of the transfer factors of the first and second sets of transfer factors and the second weighting;
determining, for each of the plurality of clients, a priority score based on the urgency score and the asset value of the at least one asset, wherein the priority score represents a risk of transfer of the at least one asset from the institution;
outputting a prioritized representation that includes a potential advising opportunity of each of the plurality of clients based on the priority score; and
in response to detecting a change in at least one transfer factor of the first or second sets of transfer factors for a respective client of the plurality of clients, updating the prioritized representation based on an updated priority score of the respective client.

8. The computing device of claim 7, wherein the client data of the first or second sets of client data includes data regarding characteristics of at least one of the client, the at least one asset of the client, and one or more beneficiaries of the client.

9. The computing device of claim 7, wherein the transfer factors of the first or second sets of transfer factors include at least one of an age of the client, a number of beneficiaries of the client, a completeness of a profile of the client by the institution, a geography of the beneficiaries of the client, and an account type of the asset of the client.

10. The computing device of claim 7, wherein the one or more processors are further configured to determine the potential advising opportunity of each of the plurality of clients based on the values of the transfer factors of the first and second sets of transfer factors.

11. The computing device of claim 7, wherein the one or more processors are further configured to order the potential advising opportunity of each of the plurality of clients in comparison to the plurality of clients based on the priority score.

12. The computing device of claim 7, wherein the one or more processors are further configured to:
determine, for each of the plurality of clients, an asset retention score based on a probability of retaining the at least one asset and the asset value of the at least one asset, wherein the asset retention score represents a projected value of retaining the at least one asset; and
determine a total asset retention score of the plurality of clients based on the asset retention score for each of the plurality of clients.

13. A non-transitory computer-readable storage medium having stored thereon instructions that, when executed, cause one or more processors of a computing device to:
dynamically update, for each of a plurality of clients, client data by:
receiving, for each of a plurality of clients, a first set of the client data, wherein each of the plurality of clients owns at least one asset held by an institution, wherein the first set of the client data includes values of a first set of transfer factors related to at least one of transfer of at least a portion of the asset to one or more beneficiaries of the client and transfer of management of the portion of the asset from the institution by the one or more beneficiaries;
periodically querying one or more databases for an asset value of the at least one asset and one or more public databases for a second set of the client data, wherein the second set of the client data includes a second set of transfer factors related to transfer of management of the portion of the asset from the institution by the one or more beneficiaries, wherein the second set of transfer factors includes biographical information of the one or more beneficiaries of the client;

receiving, from the one or more databases, the second set of transfer factors for each of the plurality of clients;

parameterizing the second set of transfer factors to determine respective values of the second set of transfer factors by:
   scanning the biographical information;
   identifying, using feature recognition, the second set of transfer factors from the scanned information; and
   assigning values to the identified second set of transfer factors;

prioritize, based on the dynamically updated client data, potential advising opportunities of the plurality of clients by:
   determining, for each of the plurality of clients, an urgency score based on the values of the transfer factors of the first and second sets of transfer factors and a weighting for each of the transfer factors of the first and second sets of transfer factors, wherein the weighting of each of the transfer factors of the first and second sets of transfer factors represents a relative influence of the respective transfer factor on a likelihood of transfer of the at least one asset from the institution, wherein the weighting of the transfer factors of the first and second sets of transfer factors comprises a first weighting associated with a first set of characteristics and a second weighting associated with a second set of characteristics, and wherein determining the urgency score based on the values of the transfer factors of the first and second sets of transfer factors and the weighting for each of the transfer factors of the first and second sets of transfer factors further comprises:
      determining, for each of a first portion of the plurality of clients having the first set of characteristics, the urgency score based on the values of the transfer factors of the first and second sets of transfer factors and the first weighting; and
      determining, for each of a second portion of the plurality of clients having a second set of characteristics, the urgency score based on the values of the transfer factors of the first and second sets of transfer factors and the second weighting;

determining, for each of the plurality of clients, a priority score based on the urgency score and the asset value of the at least one asset, wherein the priority score represents a risk of transfer of the at least one asset from the institution;

outputting a prioritized representation that includes a potential advising opportunity of each of the plurality of clients based on the priority score; and in response to detecting a change in at least one transfer factor of the first or second sets of transfer factors for a respective client of the plurality of clients, updating the prioritized representation based on an updated priority score of the respective client.

14. The non-transitory computer-readable storage medium of claim 13, wherein the instructions further cause the one or more processors to:
determine, for each of the plurality of clients, an asset retention score based on a probability of retaining the at least one asset and the asset value of the at least one asset, wherein the asset retention score represents a projected value of retaining the at least one asset; and
determine a total asset retention score of the plurality of clients based on the asset retention scores for the plurality of clients.

15. The method of claim 1, further comprising:
tracking, by the one or more processors and for each of the plurality of clients, retention of the at least one asset by the institution as historical client data.

16. The method of claim 15, further comprising:
analyzing, by the one or more processors, the historical client data to determine a probability of the at least one asset being retained by the institution; and
adjusting, by the one or more processors, the weighting of at least one of the transfer factors of the first or second sets of transfer factors to reduce a difference between the urgency score and the probability of the at least one asset being retained by the institution.

17. The method of claim 1, wherein the prioritized representation comprises at least one of:
an ordered list of the potential advising opportunities of the plurality of clients based on the respective priority scores; or
a classification of two or more tiers of potential advising opportunities of the plurality of clients based on the respective priority scores.

\* \* \* \* \*